Patented Apr. 6, 1943

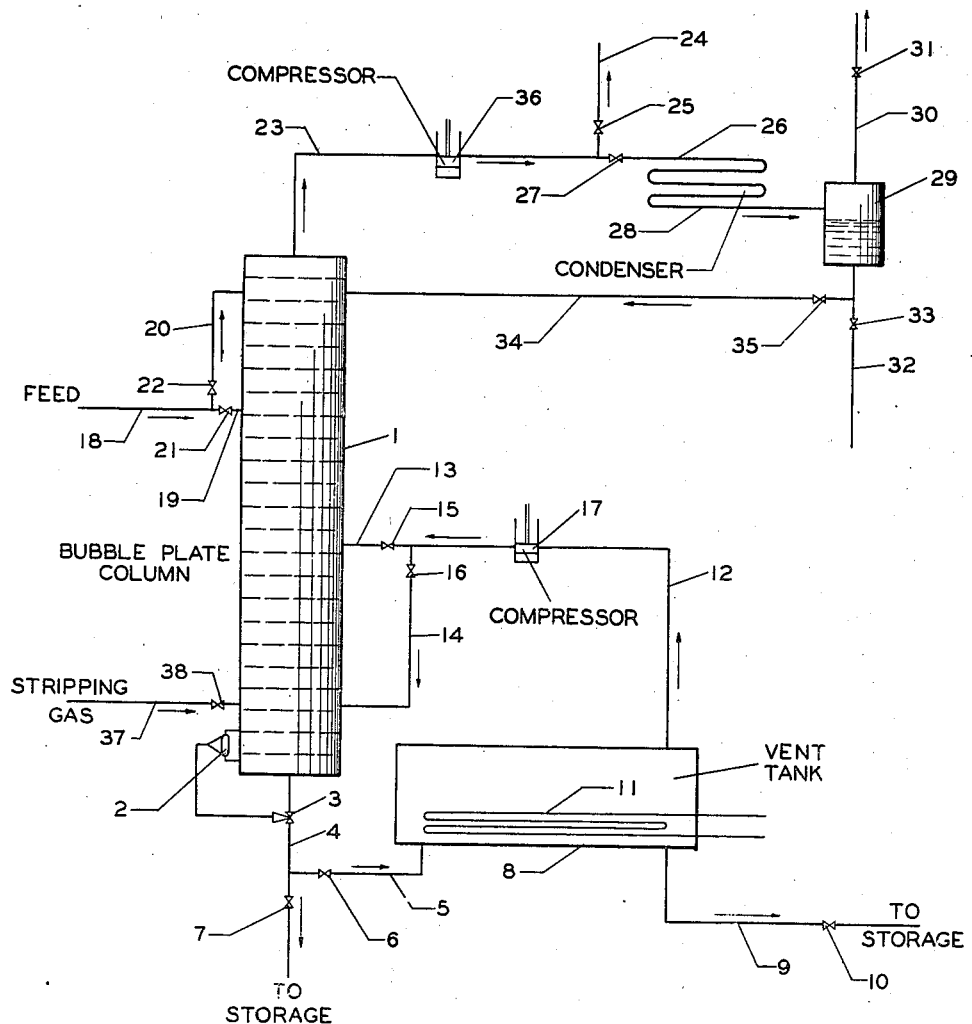

2,315,843

UNITED STATES PATENT OFFICE 2,315,843

METHOD OF DEGASSING LIQUIDS

Harry E. Drennan, Phillips, Tex., and William G. Hiatt and William H. Creel, Bartlesville, Okla., assignors to Phillips Petroleum Company, a corporation of Delaware Application April 20, 1939, Serial No. 269,022

2 Claims. (Cl. 196—11)

The present invention relates to an improved method of separating gases and liquids.

More specifically the invention relates to an improved method of eliminating undesirable gases or volatile vapors from liquids containing the same in solution.

There are many instances in industry where a liquid has undesirable light components dissolved therein which are very difficult to eliminate entirely. Additionally these light components are often of value themselves when segregated and their separation from the solution may be desirable in this regard.

An example of the presence of this problem is the occurrence of gaseous or vaporous components such as oxygen, hydrogen, hydrogen sulfide, methane, ethane, and other light hydrocarbons in crude oil and its products. These components are especially undesirable in such products as gasoline and motor fuels generally.

In the past such light undesirable products were eliminated from the gasoline by passing the same through a tank wherein the pressure was maintained below atmospheric and the evolved vapors were sent to a vapor recovery system to recover the heavier hydrocarbons vented in the tank. The raw gasoline must not be subjected to even moderately high temperatures since the instability of the raw product will result in the formation of polymers and other undesirable products. This method was disadvantageous in that the venting of the undesirable light components was not complete as will be obvious and the method threw a heavy load on the vapor recovery system of the refinery.

The present invention contemplates the retention of the vacuum tank but the vapors evolved therein are used as a stripping medium on the raw gasoline being treated. These vapors are supplemented, if desired, by the use of an auxiliary hydrocarbon stripping medium, the composition of which does not include the undesirable components. One of the main undesirable components of the gasoline and hydrocarbon products produced in certain localities is hydrogen sulfide. The auxiliary stripping medium in such instances can be a sweet natural gas or any other sweet gas available in the refinery.

Altho the present invention will be described as applied to removing undesirable light components from motor fuels and such products of a petroleum refinery, it will be obvious that the steps involved may be applied to other industrial problems with slight or no modification.

An important object of the present invention is to provide an improved method of eliminating a light component from a liquid in which the same is dissolved.

A further important object of the present invention is to provide a method of separating gases and liquids in which the liquid is contacted with a stripping medium comprising vapors subsequently evolved from the stripped liquid at a pressure lower than that at which it is contacted with the stripping medium.

A further important object of the present invention is to provide a method of removing dissolved gases from solution in a liquid by rectifying the liquid under vacuum.

A further important object is to separate a dissolved gas from a liquid which is unstable under moderately high temperature by stripping the liquid with a stripping medium subsequently evolved from the stripped liquid by reduction in pressure.

Referring to the drawing the figure is a diagrammatic showing of apparatus which can be used for carrying out the present invention.

In the figure reference numeral 1 indicates generally a bubble plate column commonly used for countercurrent contact between vapors and liquids. Altho a bubble plate column is shown, it will be obvious that any form of vapor liquid contact apparatus will be satisfactory. At the lower end of column 1 is a liquid level control device 2 controlling a valve 3 interposed in a conduit 4 connected to the base of column 1. A conduit 5 branches from conduit 4, and valves 6 and 7 in these conduits control the flow. Conduit 5 terminates in a tank 8 which in turn has a conduit 9 with a valve 10 interposed therein for controlling withdrawal of liquid from tank 8. A heat exchange coil such as that indicated at 11 may be used, if desired, in tank 8. A vapor eduction conduit 12 connects the vapor space in tank 8 with the column 1 and is branched at 13 and 14 which branches are controlled by valves 15 and 16 respectively to make possible admitting the vapors at the bottom or an intermediate point, or both, in the column. A compressor or vacuum pump 17 is interposed in conduit 12. A liquid feed conduit 18 having branches 19 and 20 controlled by valves 21 and 22 respectively serves to admit the liquid to be treated at either the top of the column or an intermediate point or both. A vapor conduit 23 connects the top of the column to a vapor withdrawal pipe 24 controlled by valve 25 and to a conduit 26 controlled by valve 27 which leads to a condenser 28 and an accumulation tank 29. A vapor withdrawal pipe 30 controlled by a valve 31 is connected to the vapor space in accumulation tank 29. A liquid withdrawal pipe 32 controlled by valve 33 is also connected to accumulation tank 29 and a conduit 34 controlled by valve 35 connects conduit 32 to the upper end of the column 1. A compressor or booster pump 36 is interposed in vapor conduit 23. An auxiliary stripping medium conduit 37 controlled by valve 38 is connected to the lower end of column 1.

In the application of the present invention to the problem of removing hydrogen sulfide and other gaseous impurities from raw gasoline, the raw gasoline is charged to the bubble plate column through conduit 18. If the entire column is to be used as a stripping column, branch 20 carries the gasoline. If the upper section of the tower is to be used as a rectifying section, branch 19 carries the gasoline. The stream of gasoline in conduit 18 may, of course, be apportioned between these two branches to achieve the best operating results. The gasoline passes down from the entry plate to the bottom of column 1 in constant contact with rising vapors in the known manner. Liquid collecting at the bottom of the column is carried by conduits 4 and 5 to tank 8 which is maintained at a lower pressure than column 1 by means of vacuum pump 17 and the action of valves 6 and 10. Depending upon the composition of the charge stock and the ambient temperature, heat may be introduced to the system, if desired, by means of heat exchanger 11. The vapors evolved from the liquid in tank 8 due to reduced pressure therein are passed by means of conduit 12 and branch 13 or 14 to the column where they rise and intimately contact the descending liquid in the column. Vapor is taken off from the top of the tower through conduits 23 and 24 with a portion directed by means of conduit 26 to condenser 28 and thence to accumulation tank 29. Uncondensed vapors are withdrawn from accumulation tank 29 through conduit 30. Liquid in accumulation tank 29 is withdrawn through conduit 32 with a desired proportion being directed through conduit 34 to the top of column 21 as reflux.

If desired and depending upon the product being treated, column 1 and tank 8 may both be maintained below atmospheric pressure with tank 8 having a lower pressure than column 1. On the other hand, however, if a very volatile product is being treated, superatmospheric pressure may be present in column 1 or both column 1 and tank 8.

Generally speaking the product to be treated is subjected to a stripping action in column 1 and either all or a part of the stripping medium to be used may be the vapors evolved by reduction in pressure on the liquid effluent of column 1 present in tank 8. If the amount of light components in the feed is small, the vapors evolved in tank 8 and on the plates of the column may be insufficient to displace all the undesirable components. In any such case auxiliary gas for stripping is furnished through conduit 37. In treatment of raw gasoline to eliminate hydrogen sulfide, this stripping gas could be sweet natural gas or any sweet hydrocarbon gas available from refinery operations.

It will be apparent that the reflux charged to the tower through conduit 24 may be omitted, if desired, and in such instances the vapors withdrawn from the top of the column may be passed to a vapor recovery system for recovery of any valuable high boiling components.

We claim:

1. A method for separating undesirable gases from gasoline comprising passing a stream of gasoline containing an undesirable gas dissolved therein into a stripping zone, intimately contacting the gasoline therein with a stripping medium, passing the gasoline effluent of the stripping zone to a zone of lower pressure wherein vapor is evolved, passing the vapors evolved in the zone of lower pressure to the stripping zone as stripping medium and passing hydrocarbon gas having a composition containing none of the undesirable gas into the stripping zone as additional stripping medium in amount sufficient to displace the undesirable gas.

2. A method for separating hydrogen sulfide from gasoline comprising passing a stream of gasoline containing hydrogen sulfide dissolved therein into a stripping zone, intimately contacting the gasoline therein with a stripping medium, passing the gasoline effluent of the stripping zone to a zone of lower pressure wherein vapor is evolved, passing the vapors evolved in the zone of lower pressure to the stripping zone as stripping medium and passing sweet hydrocarbon gas into the stripping zone as additional stripping medium in amount sufficient to displace the hydrogen sulfide.

HARRY E. DRENNAN.
WILLIAM G. HIATT.
WILLIAM H. CREEL.